United States Patent [19]
Tabuchi

[11] Patent Number: 5,822,583
[45] Date of Patent: Oct. 13, 1998

[54] SYSTEM FOR DESIGNATING MATCHING CONDITION AS SELECTED MATCHING CONDITION TO GENERATE AN EVENT IF THAT SELECTED MATCHING CONDITION IS SATISFIED

[75] Inventor: Masahiro Tabuchi, Tokyo, Japan

[73] Assignee: NEC Corporation, Tokyo, Japan

[21] Appl. No.: 520,717

[22] Filed: Aug. 29, 1995

[30] Foreign Application Priority Data

Aug. 29, 1994 [JP] Japan .................................. 6-203542

[51] Int. Cl.$^6$ .............................. G06F 9/46; G06F 11/30
[52] U.S. Cl. .......................... 395/670; 395/682; 395/835
[58] Field of Search .................................. 395/835, 682, 395/284, 680, 670

[56] References Cited

U.S. PATENT DOCUMENTS

| | | | |
|---|---|---|---|
| 4,319,321 | 3/1982 | Anastas et al. ........................ | 364/200 |
| 5,355,484 | 10/1994 | Record et al. ........................ | 395/650 |
| 5,423,000 | 6/1995 | Kimura et al. ........................ | 395/200 |
| 5,528,516 | 6/1996 | Yemini et al. ........................ | 364/551.01 |
| 5,553,288 | 9/1996 | Hosaka et al. ........................ | 395/650 |
| 5,608,908 | 3/1997 | Barghouti et al. ...................... | 395/703 |
| 5,625,821 | 4/1997 | Record et al. ......................... | 395/670 |

*Primary Examiner*—Thomas C. Lee
*Assistant Examiner*—Rehana Perreen
*Attorney, Agent, or Firm*—Foley & Lardner

[57] ABSTRACT

An event generating and delivering system in a computer system has an output portion for outputting an output data as a result of process by an application program, a storage portion preliminarily storing output data designated for producing events among the output data as matching conditions, a recognition judgement portion for inputting output data output in the output means, reading out the matching condition from the storage means, making judgement whether the output data read out is matched with the matching condition or not and outputting the result of judgement, an event generating and delivering means for generating a predetermined event corresponding to the output data when matching is judged by the recognition judgement means, and a monitor application program for receiving the generated event and executing a preliminarily defined process content corresponding to the event. Thus, the event generating and delivering system dynamically generates the event corresponding to the result of output, such as graphic output, audio output and so forth and automatically executes the process corresponding the generated event.

10 Claims, 9 Drawing Sheets

SYSTEM FOR DESIGNATING MATCHING CONDITION AS SELECTED MATCHING CONDITION TO GENERATE AN EVENT IF THAT SELECTED MATCHING CONDITION IS SATISFIED

BACKGROUND OF THE INVENTION

1. Field of the Invention

The present invention relates generally to a system for generating and delivering an event in a computer system. More specifically, the invention relates to an event generating and delivering system for generating an event as a result of recognition of a result of output of a computer according to a recognition algorithm.

2. Description of the Related Art

Figure 10:
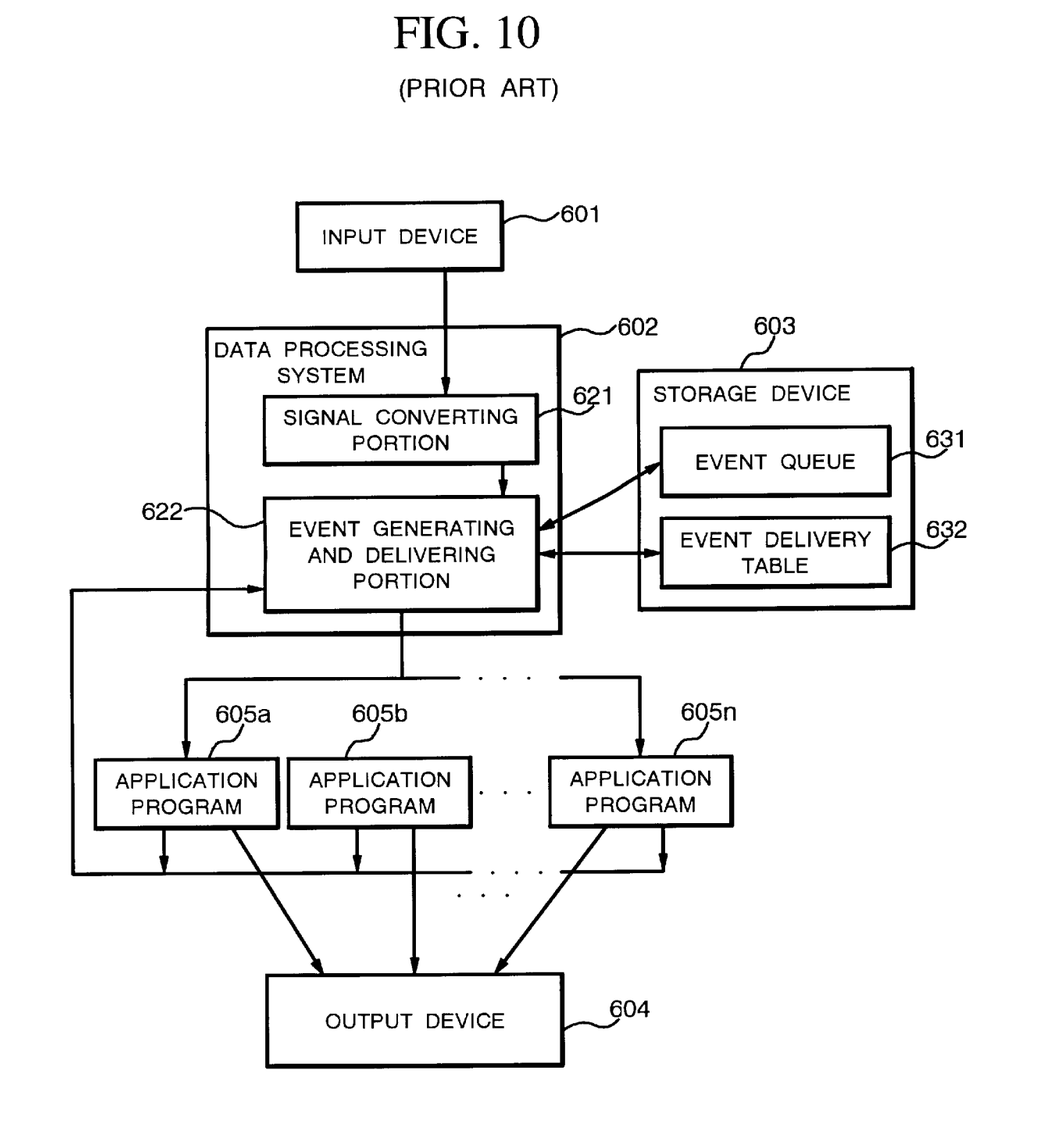
FIG. 10 is a block diagram showing the construction of the conventional event generating and delivering system.

Conventionally, such event generating and delivering system is employed for enabling a computer system (operating system) to obtain input from a user or state variation of an application. FIG. 10 is a block diagram showing a construction of an event-driver type computer system including the conventional event generating and delivering system.

An input signal input by a user through an input device 601 is converted into an input data by a signal converting portion 621 of a data processing system 602. The converted input data is then transferred to an event generating and delivering portion 622. The event generating and delivering portion 622 generates an event corresponding to an input data, stores the generated event in an event queue 631 in a storage device 603, and delivers an event string taken from the event queue 631 to application programs 605a to 605n.

For example, a system software, such as an operating system of MACINTOSH (trademark) and WINDOWS (trademark), generates an event in response to an input by the user through the input device, such as a keyboard, mouse or so forth, and stores the event in the event queue. A part of the events stored in the event queue are delivered to a plurality of application programs. (see Inside Macintosh, Volume IV, Part 1 by Apple Computer, Inc.)

The application programs 605a to 605n execute appropriate process routines corresponding to events provided thereto and output the results of the process to output devices 604, such as a graphic output device or audio output device.

On the other hand, in the event generating and delivering portion 622, by generating the event from state variation of the application program, transfer of the events between the application programs 605a to 605n becomes possible. For example, in case of operating system of Macintosh, there is provided a means for generating a message defining the application program as an application event and re-delivering to the application.

Furthermore, the operating system of Macintosh provides a means for automatic triggering of a process routine by a managing event and the corresponding processing routine by means of an event delivery table 631 of the storage device 603 in the event generating and delivering portion 522.

For example, in the operating system of Macintosh, means for registering the event of the definition of the application and the corresponding process routine is realized by a module called as an EventManager in the operating system. Also, in X window system widely used by Unix work station, means for registering the event delivered by the X window system and the processing routine to be triggered upon reception of the event, is realized by a program library called as TOOLKIT.

The application program in the conventional event generating and delivering system may process the event generated in response to the user input or the event defined by the application program. However, such application program cannot dynamically define an event that specifically corresponds to the content of the output, such as graphic output or audio output and so forth. For example, it is not possible to generate the event notifying the fact that a specific error message of the application program is output, without rewriting the application program to include the capability of generating an event based upon output content. Therefore, judgement that the specific error message is present, can only be made by the user. Such operations cause substantial load on the user.

SUMMARY OF THE INVENTION

Therefore, it is an object of the present invention to solve the problems in the prior art set forth above.

Another and more specific object of the present invention is to provide an event generating and delivering system in a computer system, in which the event can be dynamically generated corresponding to a state of output, such as a graphic output, audio output or so forth, from a computer system, and whereby can reduce load on a user by releasing the user from manual operation which is otherwise performed by the user according to the own judgement.

According to the first aspect of the invention, an event generating and delivering system in a computer system, comprises:

output means for outputting an output data as a result of process by an application program;

storage means for preliminarily storing output data designated for producing events among the output data as matching condition;

recognition judgement means for inputting output data output in the output means, reading out the matching condition from the storage means, making judgement whether the output data read out is matched with the matching condition or not and outputting the result of judgement;

event generating and delivering means for generating a predetermined event corresponding to the output data when matching is judged by the recognition judgement means; and means for receiving the generated event and executing a preliminarily defined process content corresponding to the event.

According to the second aspect of the invention, an event generating and delivering system in a computer system, comprises:

output means for outputting an output data as a result of process by an application program;

storage means for preliminarily storing output data designated for producing events among the output data as matching condition;

a plurality of recognition judgement means for inputting output data output in the output means, reading out mutually different matching conditions from the storage means, making judgement whether the output data read out is matched with the matching condition or not and outputting the result of judgement;

event generating and delivering means for generating a predetermined event corresponding to the output data when matching is judged by the recognition judgement means; and means for receiving the generated event and executing a preliminarily defined process content corresponding to the event.

According to the third aspect of the invention, an event generating and delivering system in a computer system, comprising:

output means for outputting an output data as a result of process by an application program;

storage means for preliminarily storing instruction output from the application program to the output means for outputting output data designated for producing events among the output data as matching condition;

recognition judgement means for inputting the instruction output to the output means, reading out the matching condition from the storage means, making judgement whether the instruction is matched with the read out matching condition or not and outputting the result of judgement;

event generating and delivering means for generating a predetermined event corresponding to the instruction when matching is judged by the recognition judgement means; and means for receiving the generated event and executing a preliminarily defined process content corresponding to the event.

A plurality of recognition programs for making judgement whether the output data and the matching condition may be matched or not, are registered with respect to the output data or the instruction and the matching condition, and the recognition judgement means may be responsive to variation of the output data or instruction of the output device, for reading out the matching condition and the recognition program corresponding to the output data or instruction from the storage means and executes the read out recognition program to make judgement whether the output data or instruction matches with the read out matching condition or not. In the alternative, a plurality of recognition programs for making judgement whether the output data or instruction and the matching condition are matched or not, may be registered with respect to the output data or instruction and the matching condition, which further comprises:

matching condition registration managing means for managing registering and reading out of the matching condition with respect to the storage means;

recognition program registration managing means for managing registering and reading out of the recognition program with respect to the storage means; and the recognition judgement means is responsive to variation of the output data or instruction of the output device to trigger the matching condition registration managing means and the recognition program registration managing means for reading out the matching condition and the recognition program corresponding to the output data or instruction from the storage means and executing read out recognition program for making judgement whether the output data or instruction and the read out matching condition are matched or not.

The output device may be a graphic display device, and the matching condition is consisted of an image data, a character data and a numerical data, and the combination thereof to be displayed on the graphic display device. Alternatively, the output device may an audio output device, and the matching condition is consisted of a voice data, a numerical data and the combination thereof to be output from the audio output device.

In the preferred construction, the recognition judgment means outputs a result of unmatching to the event generating and delivering means for generating an event with respect to a result of unmatching by the event generating and delivering means when the output data or instruction does not match with the matching condition.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of the present invention will be discussed hereinafter with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessarily obscure the present invention.

Figure 1:
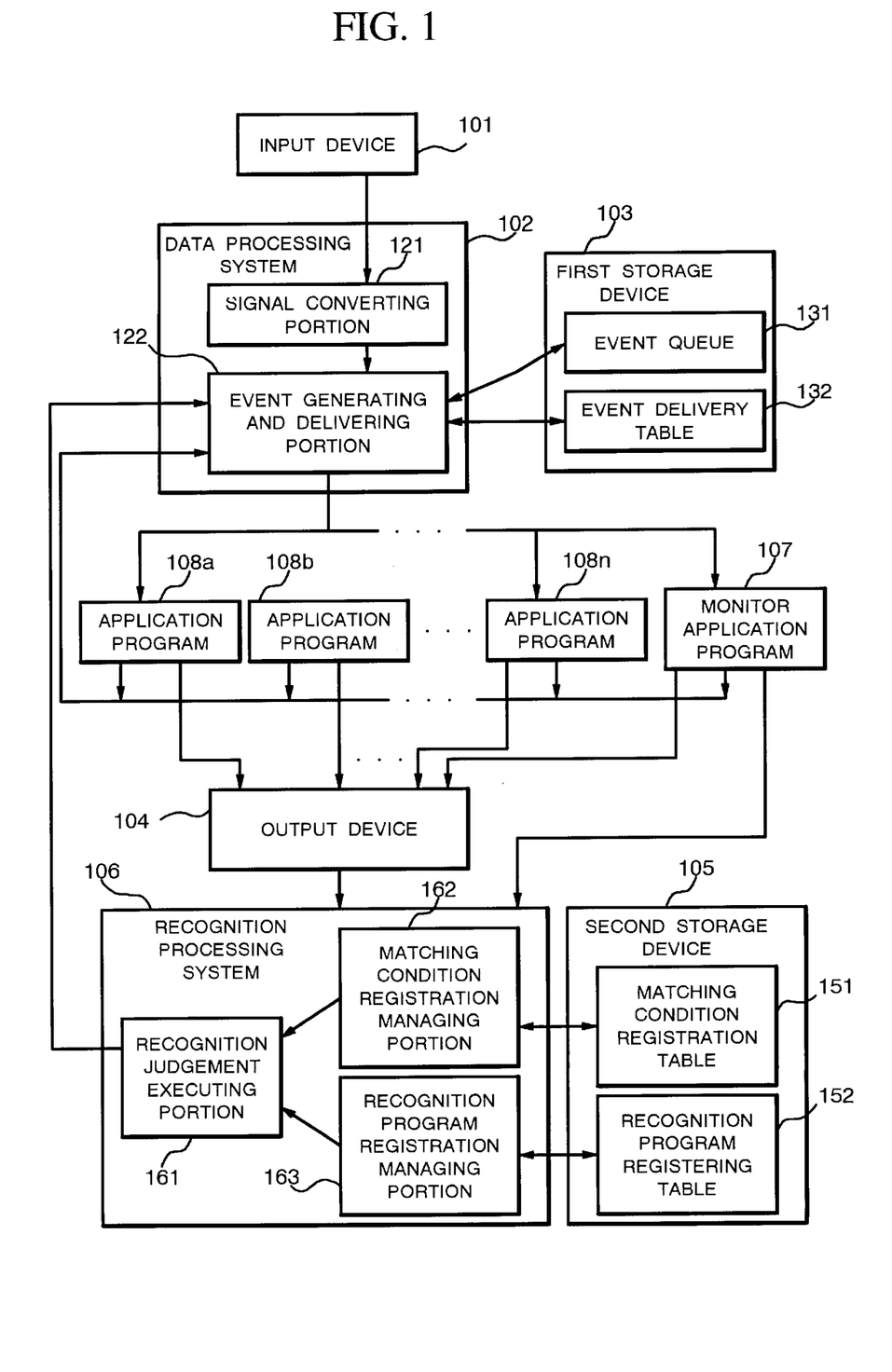
FIG. 1 is a block diagram showing the construction of the first embodiment of an event generating and delivering system in a computer system according to the present invention.

FIG. 1 is a block diagram showing a construction of the first embodiment of an event generating and delivering system according to the present invention. The shown embodiment is directed to a computer system and an output of an arbitrary application program executed thereon. For example, an event is generated depending upon the content of an error message and the state of the screen, and a process corresponding to the event is automatically executed. Namely, the operation which has been performed according to a judgement on the basis of the output condition made by a user, can be taken over by the computer system for automatic operation.

In FIG. 1, the shown embodiment of the event generating and delivering system according to the present invention, is constructed with an input device 101, such as a keyboard, mouse and so forth, a data processing system 102, a first storage device 103, an output device 104, such as a display unit, an audio output device and so forth, a second storage device 105 storing a matching condition, a recognition program, a recognition processing system 106 making judgement whether the input data is matched to the matching condition provided by the recognition program, a monitor application program obtaining recognition event via the event generating and delivering portion and executing process depending upon the content of the event, and a plurality of application programs 108*a* to 108*n*.

The data processing system 102 has a signal converting portion 121 and an event generating and delivering portion 122. On the other hand, the recognition processing system 106 includes a recognition judgement executing portion 161, a matching condition registration managing portion 162 and a recognition program registration managing portion 163. The data processing system 102 and a recognition processing system 106 are realized by CPU. The event generating and delivering portion 122, the recognition judgement executing portion 161, the matching condition registration managing portion 162 and the recognition program registration managing portion 163 are realized by the operating system and so forth active on the CPU.

The first storage device 103 contains an event queue 121 and an event delivery table The output device 104 includes a graphic display unit, such as a display unit and/or an audio output device for outputting a message or so forth by voice, by process of application program.

An input signal input by the user through the input device 101 is converted into an input data by a signal converting portion 121 of the data processing device 102. The input data is then transferred to the event generating and delivering portion 122. A recognition result data from the recognition processing system 106 is transferred to the event generating and delivering portion 122. The event generating and delivering portion 122 generates events corresponding to input data and stores the generated events in the event queue 131 of the first storage device 103 in order. An event string taken from the event queue 131 is delivered to the application programs 108*a* to 108*n* or the monitor application program 107.

The application programs 108*a* to 108*n* and the monitor application program 107 execute appropriate processing routine with respect to the provided event, and outputs result of process to the output device.

On the other hand, in the event generating and delivering portion 122, transfer of events between the application programs 108*a* to 108*n* is enabled by generating state variation in the application program as event.

Also, in the event generating and delivering portion 122, by managing the event and the process routine corresponding to the event with the event delivery table 131 of the storage device 103, the process routine in the application program corresponding to the generated event can be automatically triggered.

The second storage device includes a matching condition registration table 151 for registering matching condition and a recognizing program registration table 152 for registering the recognizing programs.

Here, the matching condition is specific data which is required to be converted into the event by the event generating and delivering portion 122, among data expressing the content output to the output device 104 by the process of the application program. For example, when the output device 104 is the display unit, the data consisted of image, character and numerical data or the combination thereof becomes the matching condition. On the other hand, when the output device 104 is the audio output device, the voice data, numerical data or the combination thereof becomes the matching condition. In the matching condition registration table 151, these data are preliminarily registered as the matching condition.

On the other hand, the recognizing program is a program to be executed by the recognizing judgement executing portion 161 of the recognition processing system 106. The recognizing program is adapted to make judgement whether the actual output state is matched to the matching condition by comparing the actual output state data obtained from the output device and the matching condition registered in the matching condition registration table 151. A plurality of recognizing programs are provided corresponding to the output state data to be judged and kinds of the matching conditions. For instance, when the output state data and the matching condition are character data, a corresponding recognizing program for characters is provided. Similarly, in case that the output state data and the matching condition are image data, the recognizing program for images is provided, and in case that the output state data and the matching condition are voice data, the recognizing program for voice is provided.

As set forth above, the recognition processing system 106 includes the matching condition registration managing portion 162 which registers and manages the matching condition defined by the user in the matching condition registration table 151 of the second storage device 105, the recognizing program managing portion 163 which manages the registered recognizing programs with a sign (e.g. address) uniquely identifying them, and the recognition judgement executing portion 161 executing judgement of matching of the matching condition by taking the data indicative of the output state of the output device 104 as the input data and executing the recognition processing program provided with respect to the output state data. The result of the process in the recognition judgement executing portion 161 is transferred to the event recognizing and delivering portion 122.

The matching condition registration managing portion 162 has a function for storing, retrieving and deleting the matching condition in the matching condition registration table 151. The user may perform storing, retrieving and deleting of the matching condition by commanding to the matching condition registration managing portion 162 through the monitor application program 107.

The recognition program registration managing portion 163 has a function for storing, retrieving and deleting the recognizing program for making judgement whether the output state data from the output device 104 matches with the matching condition or not, in the recognizing program registration table 152. The user may perform storing, retrieving and deleting of the user defined recognizing program by commanding to the recognition program registration managing portion 163 through the monitor application program 107.

On the other hand, the recognition judgement executing portion 161 has a control parameter for controlling whether the data to be converted into the events should be transferred to the event recognizing and delivering portion 122 or not depending upon state of matching or unmatching of the results of recognition. The control parameter can be set by the user through the monitor application program 107.

This control parameter is used to entrust a final judgment to the user in the case that the output state data is not adapted to the matching condition. When the control parameter is true and the output state data is not adapted to the matching condition, such event that induces appropriate operation to the user is generated. This control parameter is used for every matching condition and true or false is set in accordance with the value of the control parameter.

For example, when the output device 104 is the graphic output device, as in the case where the application programs 108a to 108n update the screen of the graphic output device, if the image output hardware performs writing in for a video RAM for display, the recognition processing system 106 is triggered in response to writing. As a result, the matching condition registration managing portion 162 and the recognition program registration managing portion 163 are triggered accordingly.

The matching condition registration managing portion 162 reads out the matching condition (data consisted of image data, character data or numerical data or the combination thereof) with respect to the image data written in the video RAM for display from the matching condition registration table 151. On the other hand, the recognition program registration managing portion 163 reads out the image recognition program from the recognizing program registration table 152.

The image recognition program thus read out is then executed by the recognition judgement executing portion 161 to perform comparison of the modified region data (image data) in the video RAM, with the matching condition by the recognition judgement executing portion 161. When the recognition judgement executing portion 161 makes judgement that matching is established between the region data and the matching condition, the data corresponding to the result of recognition is transferred to the event recognizing and delivering portion 122 as data for recognition event. On the other hand, if the recognition judgement executing portion 161 makes judgement that the region data and the matching condition do not match with each other, control is performed to selectively transfer or not transfer the event to the event recognizing and delivering portion 122 depending upon the condition of the control parameter for conversion to the event of the recognition judgement executing portion 161.

On the other hand, when the output device is the audio output device, once notice that the voice data is input to the audio output data device hardware from one of the application programs 108a to 108n, is given, the recognition processing system 106 is triggered in response. The manner of triggering the matching condition registration managing portion 162 and the recognition program registration managing portion 163 and the manner of triggering the recognition judgement executing portion 161 are substantially the same as those for the case of the image output.

The monitor application program 107 has a function for storing, deleting and retrieving matching conditions or the recognizing programs in the second storage device 105 by controlling the matching condition registration managing portion 162 and the recognition program registration managing portion 163, and a function for obtaining a recognizing event from the event generating and delivering portion 122 and executing the process depending upon the content of the event. It should be noted that the monitor application program 107 may be consisted of respectively independent application programs for registering the matching condition and the recognizing program in the second storage device 105 and for executing process corresponding to the recognizing event.

Figure 2:
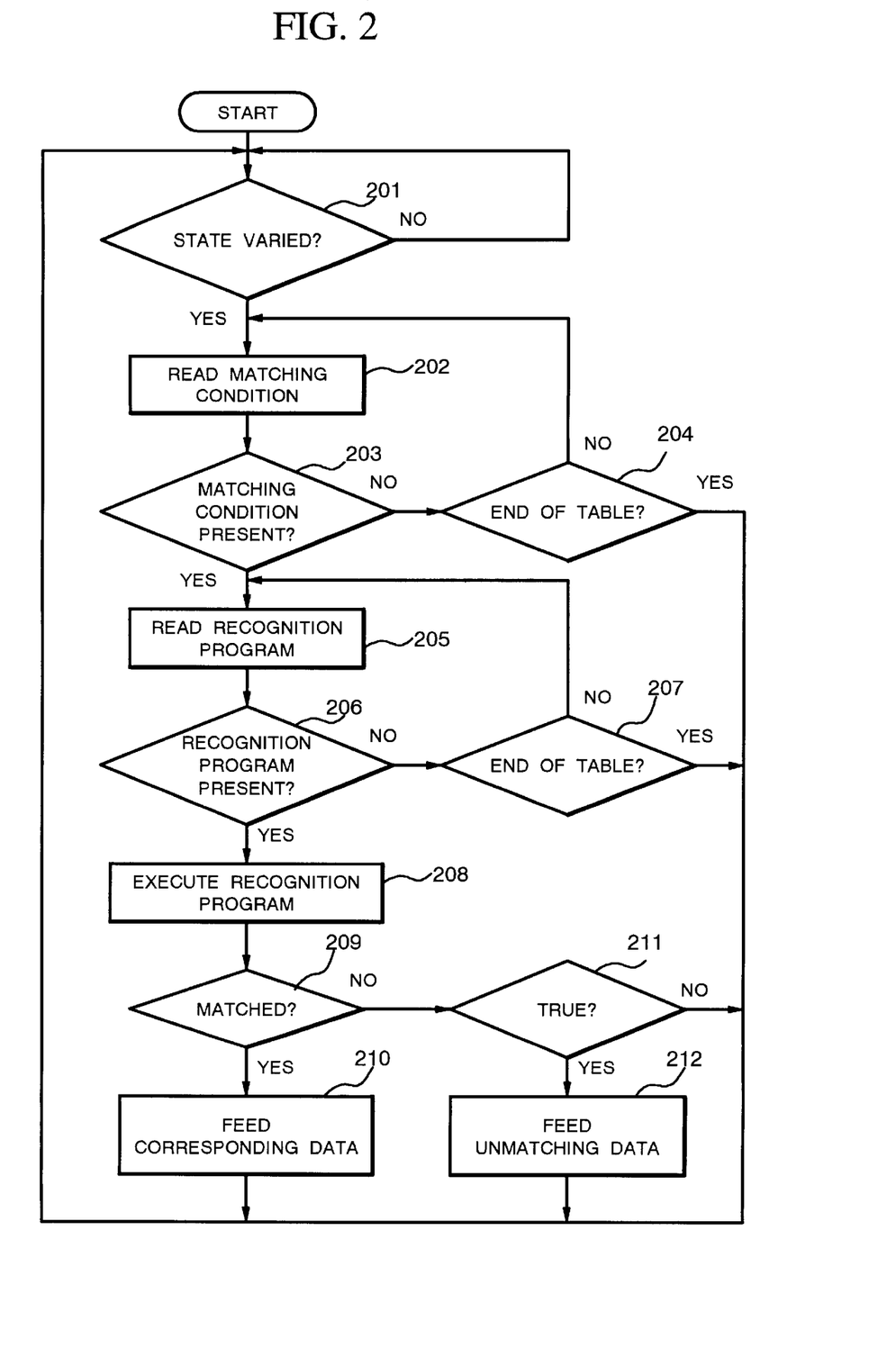
FIG. 2 is a flowchart showing the operation in the first embodiment of the event generating and delivering system according to the invention.

Next, the operation of the first embodiment of the event generating and delivering system will be discussed with reference to the flowchart of FIG. 2.

When the state of the output device 104 is varied, the varied output state data is supplied to the recognition processing system 106 (step 201). When the output device 104 is the graphic output device, the recognition processing system is triggered in response to writing of data in the video RAM for display. For the recognition processing system 106, the varied region (varied image data) of the video RAM for display is supplied. Accordingly, the matching condition registration managing portion 162 reads out the matching condition for the image data from the matching condition registration table 151 (step 202). Upon reading of the matching condition, the contents of the matching condition registration table 151 are retrieved in order. When the matching condition corresponding to the output state data is not present even when the retrieval reaches the end of the matching condition registration table 151 (steps 203 and 204), the process ends. Then, the process enters into the waiting state for waiting the next output state data of the output device 104.

When the matching condition corresponding to the output state data is read out, the recognition program registration managing portion 163 reads out the recognizing program for evaluating whether the output state data is adapted to the matching condition, from the recognizing program registration table 152 of the second storage device 105 (step 205). Upon reading out of the recognizing program, the contents of the recognizing program registration table 152 are retrieved in order. When the recognizing program corresponding to the matching condition cannot be found even after retrieval to the end of the recognizing program registration table 152 (steps 206, 207), the process ends. Then, the process enters into the waiting state for waiting the next output state data of the output device 104.

Once reading out of the matching condition and the recognizing program is completed, the recognizing program is executed by the recognition judgement executing portion 161 of the recognition processing system 106 of FIG. 1 (step 208) to check if the output state data is adapted to the given matching condition or not (step 209).

When the output state data is adapted to the matching condition as checked at the step 209 and thus the result of checking is positive, the data corresponding to the result of recognition is transferred to the event recognizing and delivering portion 122 of the data processing system 102 from the recognition judgement executing portion 161 (step 210). On the basis of the data transferred from the recognition judgement executing portion 161, the event recognizing and delivering portion 122 generates the corresponding event.

The event thus generated by the event recognizing and delivering portion 122 is delivered to the monitor application program 107 which takes over the user's operation. When the event is delivered to the monitor application program 107, the monitor application program 107 executes the process corresponding to the delivered event.

On the other hand, when matching between the output state data and the matching condition cannot be established as a result of checking at the step 209, thus the result of checking is negative, the value of the control parameter for conversion into event in the recognition judgement executing portion 161 is checked (step 211). If the value of the control parameter is true, a data indicative that the result of the recognition is unmatching, is transferred to the event recognizing and delivering portion 122, and if the value of the control parameter is false, the process returns to the initial state to wait for the state variation of the output device 104. Accordingly, when the value of the control parameter for generating the event is true, the data indicative of failure of recognition is generated as recognition event by the event recognizing and delivering portion 122, whereas when the value of the control parameter is false, the recognition event is not generated. The event thus generated by the event recognizing and delivering portion 122 is delivered to the monitor application program 107. Then, the process corresponding to the delivered event is executed. The process that outputs such message that induces appropriate operation to the user by a display or voice is conceivable as the process of this case.

Next, discussion will be given for a concrete example. Here, discussion will be given for an embodiment, in which the monitor application program 107 is applied in work flow process (continuous process) of standardized work performed between a plurality of applications 108a, 108b, . . . 108n.

In case of an application having a Graphical User Interface (GUI), it is typical that a dialog window accompanying an error message appears at the occurrence of error to wait for further command to be entered by the user. Therefore, at the occurrence of error in any one of the applications 108a, 108b, . . . 108n during process of work flow, even when no significant problem would arise from skipping the faulty process and executing the next and subsequent processes, the work flow process is interrupted at the application, causing an error.

However, it is possible to continue execution of the desired work flow process without interruption by setting the monitor application program 107 to monitor the error messages output from the applications 108a, 108b, . . . 108n and to automatically issue a predetermined command on behalf of the user.

For instance, consideration is given for the case where when a matching condition having the content of "character strings NOT ENOUGH MEMORY and WINDOW CANNOT OPEN will appear" is registered in the matching condition registration table 151 by user definition, and a character recognition program for recognizing the character strings is registered in the recognition program registering table 152.

Figure 3:
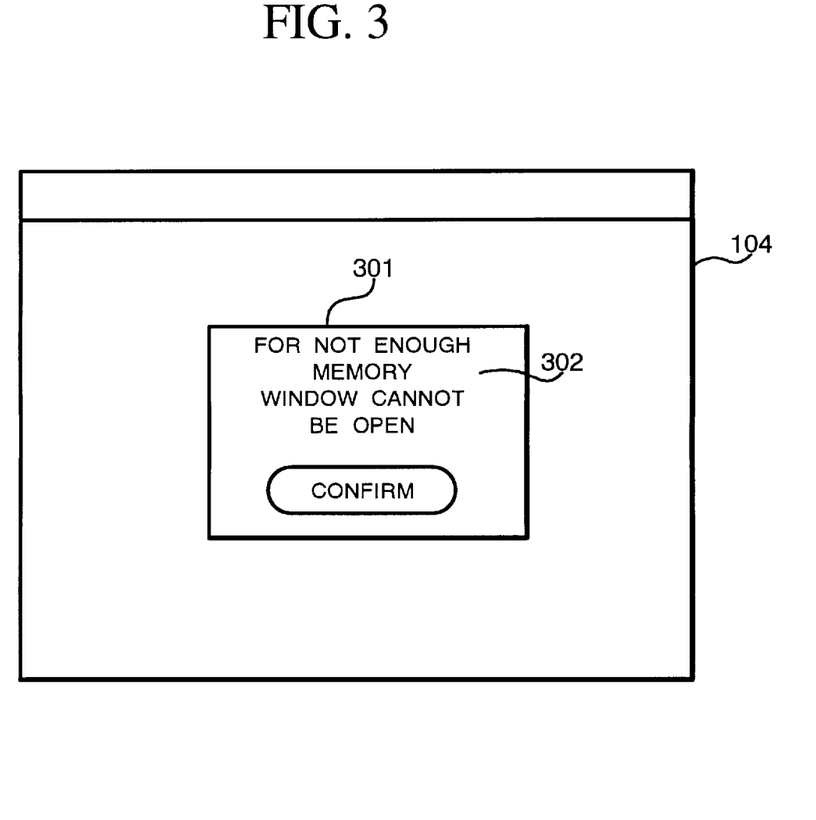
FIG. 3 is an illustration showing an example of a dialog window containing an error message output to a graphic display device as an output device.
Figure 4:
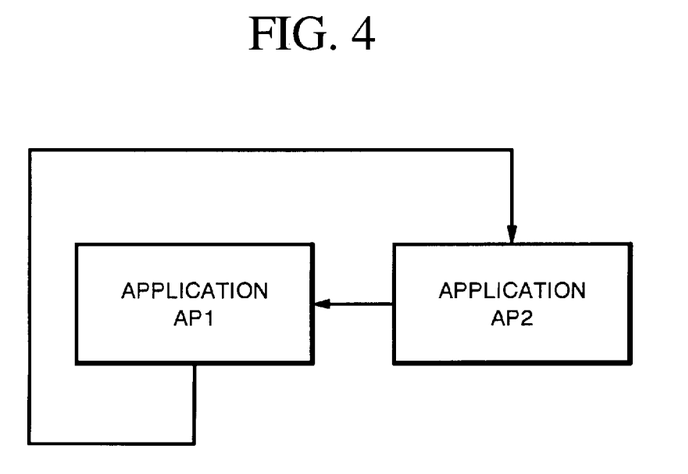
FIG. 4 shows an operational state of an application program in a state where a work flow processing is performed.

At this time, as shown in FIG. 4, it is assumed that a dialog window 301 displaying an error message 302, as shown in FIG. 3" appears on the screen of the graphic output device as the output device 104 during execution of the certain application AP1. Then, state variation of the graphic output device is caused. Namely, in such case, since the display data corresponding to the error message 302 is written in the video RAM for display, the state variation is detected by the recognition processing system 106. Then, the matching condition registered in the matching condition registration table 151 and the character recognition program registered in the recognition program registering table 152 are read out. Thus, the recognition judgement process is performed.

When the output error message 302 matches the matching condition, the event corresponding to the result is generated by the event recognizing and delivering portion 122 and delivered to the monitor application program 107.

The monitor application program 107 is preliminarily defined that if the event corresponding to the error message 302 is delivered to the monitor application program 107, the monitor application program 107 may click a confirmation button in the dialog window 301 of the error message 302 on behalf of the user to close the dialog window 301. Therefore, when the event is delivered to the monitor application program 107 which takes over the operation of the user, the monitor application program 107 clicks the confirmation button in the displayed dialog window 301 on behalf of the user to close the dialog window.

By this, the work flow process will never be interrupted at the application AP1, in which the error message 302 is issued, and can be continued automatically, When the foregoing operation is not performed, the work flow process may be interrupted until clicking of the confirmation button by the user after checking the error message 302 of the dialog window.

Figure 5:
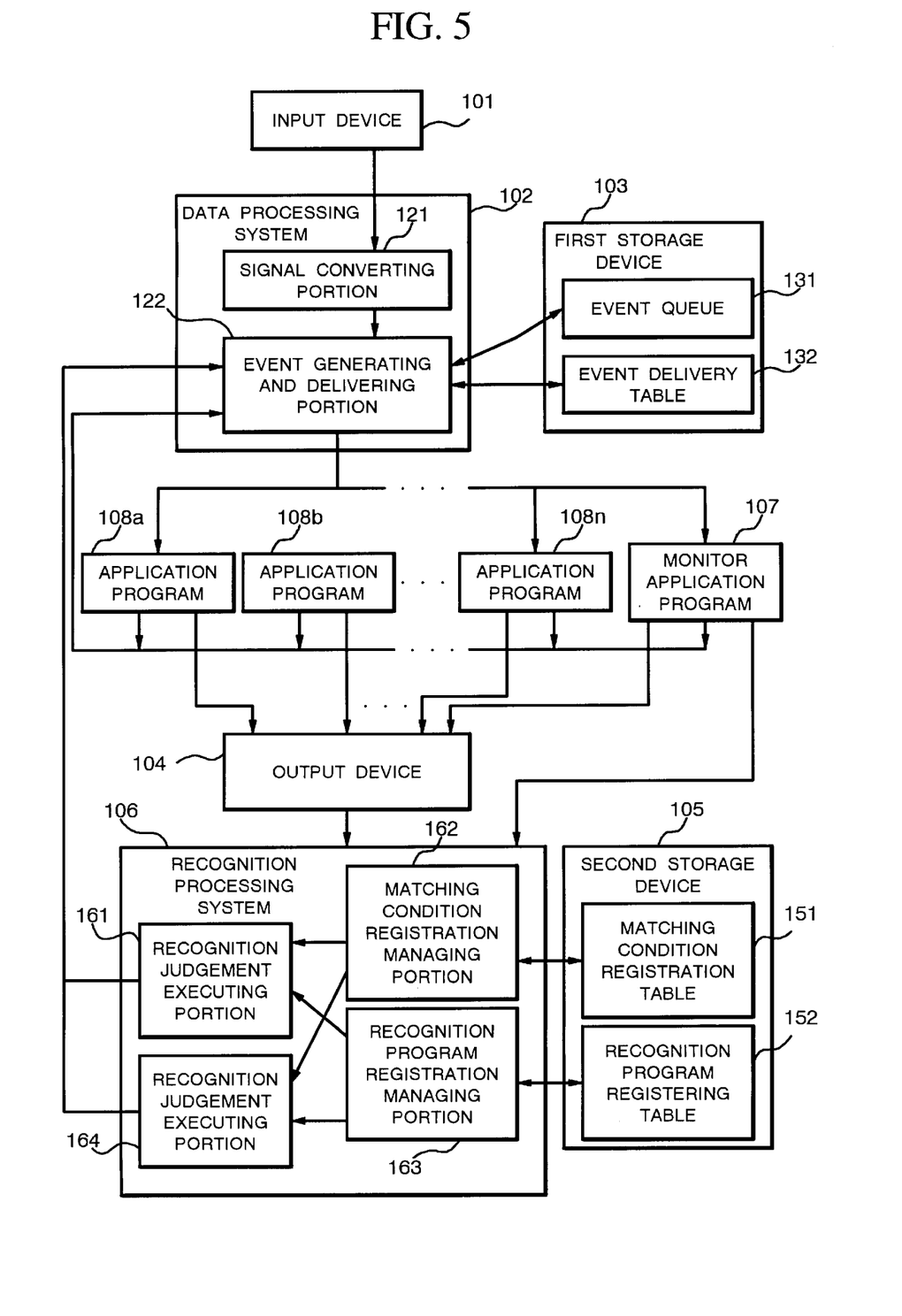
FIG. 5 is a block diagram showing the construction of the second embodiment of an event generating and delivering system in a computer system according to the present invention.

FIG. 5 is a block diagram showing the second embodiment of the event generating and delivering system in the computer system according to the present invention. In FIG. 5, like elements to those in FIG. 1 will be represented by the like reference numerals and discussion therefor will be neglect for keeping disclosure simple enough for facilitating understanding of the invention.

In the shown second embodiment, a recognition judgement executing portion 164 for making judgement whether the output state data from the output device matches with the matching condition, is performed by execution of the recognition program. With such construction, two recognition judgement executing portions 161 and 164 operate in parallel, simultaneously. The recognition judgement executing portions 161 and 164 will not execute recognition under the same matching condition and the same recognizing program, simultaneously, and simultaneously executes recognition under mutually different matching conditions and mutually different recognition programs. The recognition judgement executing portions 161 and 164 are controlled so as not to perform judgement of matching under the same matching condition by making judgement whether the matching condition which is to be read out, is read out in the other recognition judgement executing portion upon reading out the matching condition.

Figure 6:
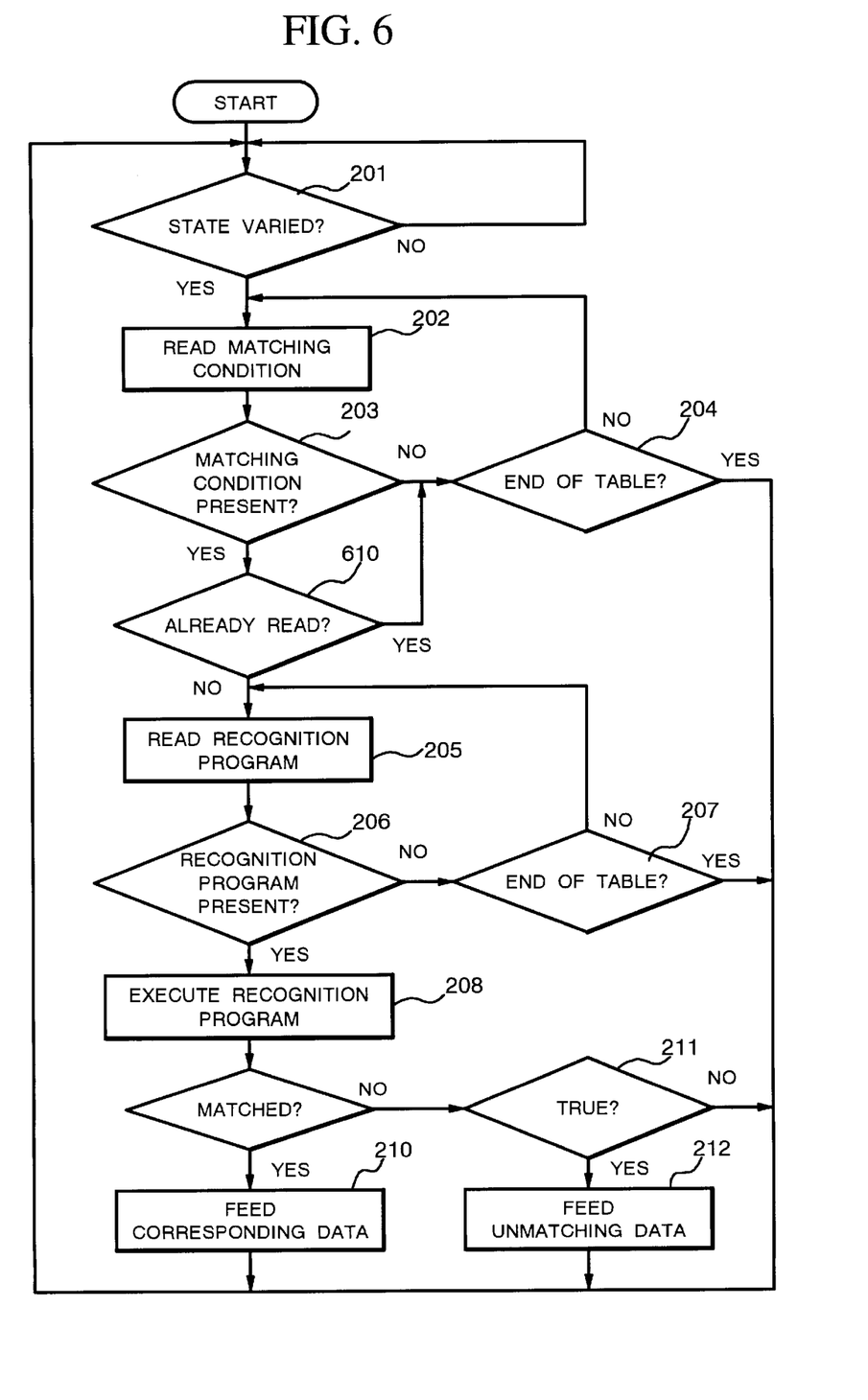
FIG. 6 is a flowchart showing the operation in the second embodiment of the event generating and delivering system according to the invention.

FIG. 6 is a flowchart showing the operation of the second embodiment of the event generating and delivering system according to the invention. In FIG. 6, like step numbers represent like processes in the former embodiment and will not be discussed in detail for simplification of the disclosure. In FIG. 6, upon reading out of the matching conditions, judgement is made that whether the matching condition to be read out has already been read out by the other recognition judgement executing portions 161 and 164 (step 610).

With the shown embodiment, in the recognition processing system 106 to be triggered in response to state variation of the output device 104, two recognitions with mutually distinct matching conditions and the recognizing programs can be performed simultaneously. Thus, events reflecting the results of recognition, can be generated simultaneously. It should be obvious to those skilled in the art to provide three or more recognition judgement executing portions, as required.

In the shown embodiment, since a plurality of recognition judgement executing portions operate simultaneously, a complicated matching condition may be registered by appropriately dividing into a plurality of fractions the condition to store in the matching condition registration table 151 so that recognition can be performed independently in respective of a plurality of recognition judgement executing portions at the same time under respective fractions of the matching condition. In this way, a period required for generating the event can be shortened.

Figure 7:
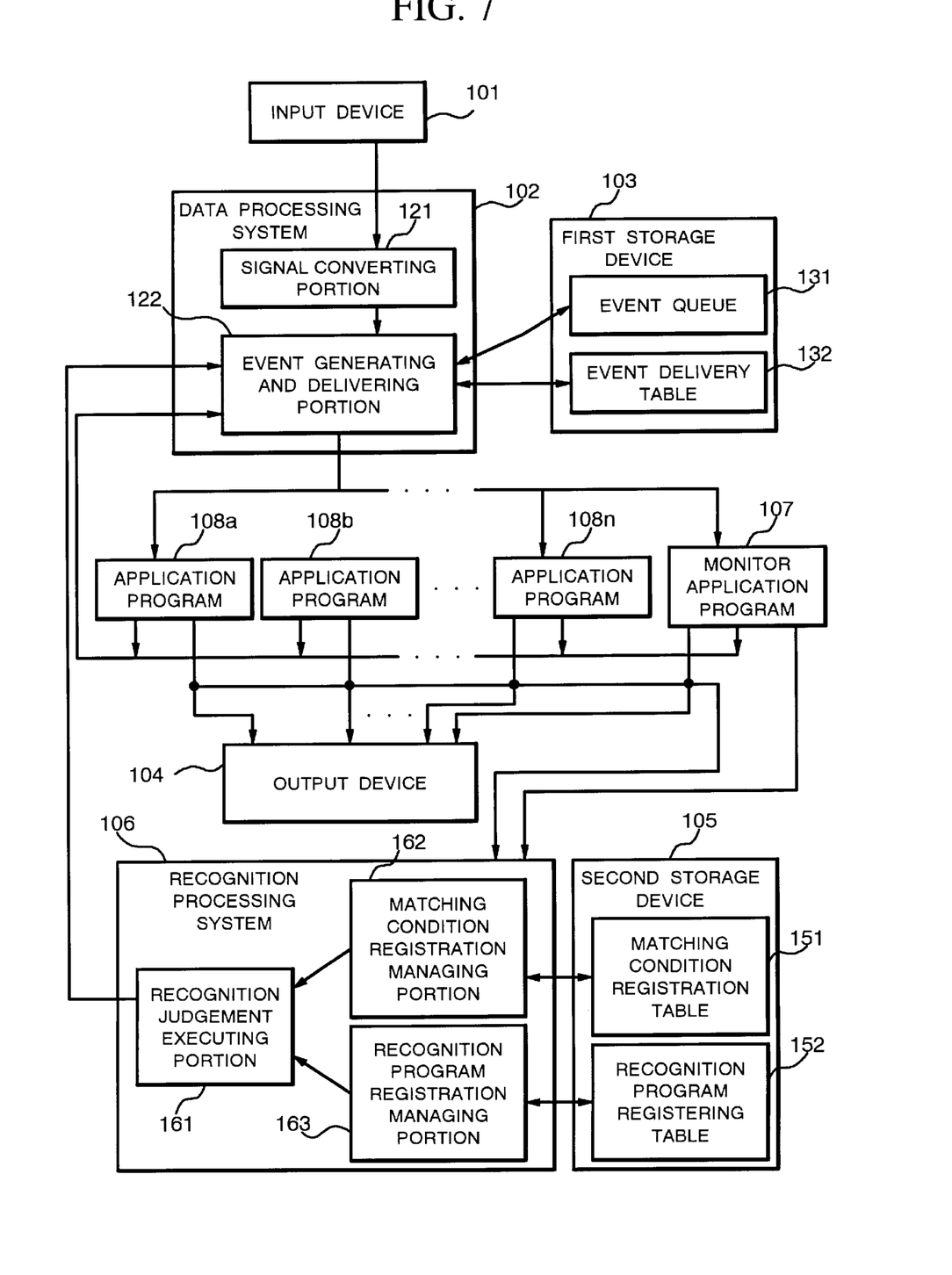
FIG. 7 is a block diagram showing the construction of the third embodiment of an event generating and delivering system in a computer system according to the present invention.

FIG. 7 is a block diagram showing the third embodiment of the event generating and delivering system in the computer system according to the present invention. In FIG. 7, like elements to those in FIG. 1 will be represented by the like reference numerals and discussion therefor will be omitted to keep disclosure simple enough for facilitating understanding of the invention.

In the third embodiment, instead of inputting the output state of the output device 104 in the recognition processing system 106, the output instruction and the output data to the output device 104 from the application program is input to the recognition processing system 106.

In the shown embodiment, similarly to the first embodiment, the recognition processing system 106 is triggered in response to state variation to the output device 104. However, the shown embodiment is differentiated from the first embodiment, in that the data to be a subject of recognition is the output instruction and the output data to be transferred to the output device 104. In general, the output instruction or the output data (data to be displayed on the screen, voice data and so forth) as the parameter corresponding to the output instruction are made abstract, the combination of the kind of the instruction and the parameter thereof can be utilized as the matching condition.

Accordingly, in the third embodiment, kind of the output instruction or the output data as the parameter thereof output from the application programs 108a to 108n to the output device 104 are registered in the matching condition registration table 151 of the second storage device 105.

On the other hand, with respect to the recognizing program registered in the recognition program registering table 152 of the second storage device 105, the recognition program registering table 152 requires only comparison of the sign corresponding to the output instruction. Therefore, in comparison with the recognition program for recognizing the result of writing in the output device 104, the structure of the program can be simplified.

Figure 8:
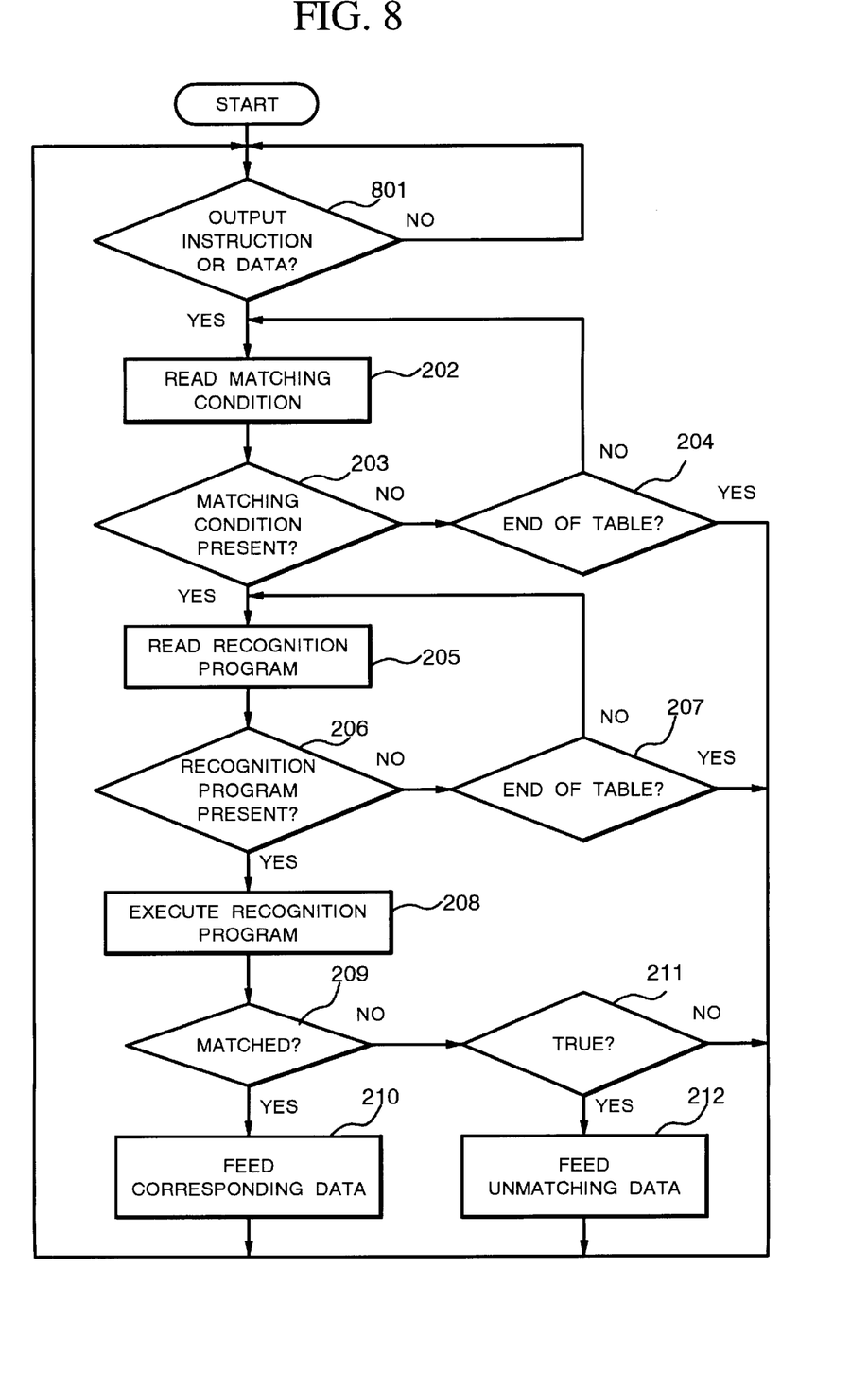
FIG. 8 is a flowchart showing the operation in the third embodiment of the event generating and delivering system according to the invention.

FIG. 8 is a flowchart showing the operation of the third embodiment set forth above. In FIG. 8, the same or similar process contents of the process steps to those of FIG. 2 will be represented by the step numbers. While the judgement whether the output state of the output device 104 is varied at the step 201 of FIG. 2, the shown embodiment as illustrated in FIG. 8 makes judgement whether the output instruction and the output data are output from the application programs 108a to 108n to the output device 104 (step 801). When the output instruction and the output data are output from the application programs 108a to 108n, similarly to the operation of FIG. 2, the output instruction and the output data are input to the recognition processing system 106. Then, judgement is made whether the output instruction and the output data input to the recognition processing system 106 are matched with the output instruction and the output data registered in the matching condition registration table 151 as the matching condition by executing the recognizing program in the recognition judgement executing portion 161.

Figure 9:
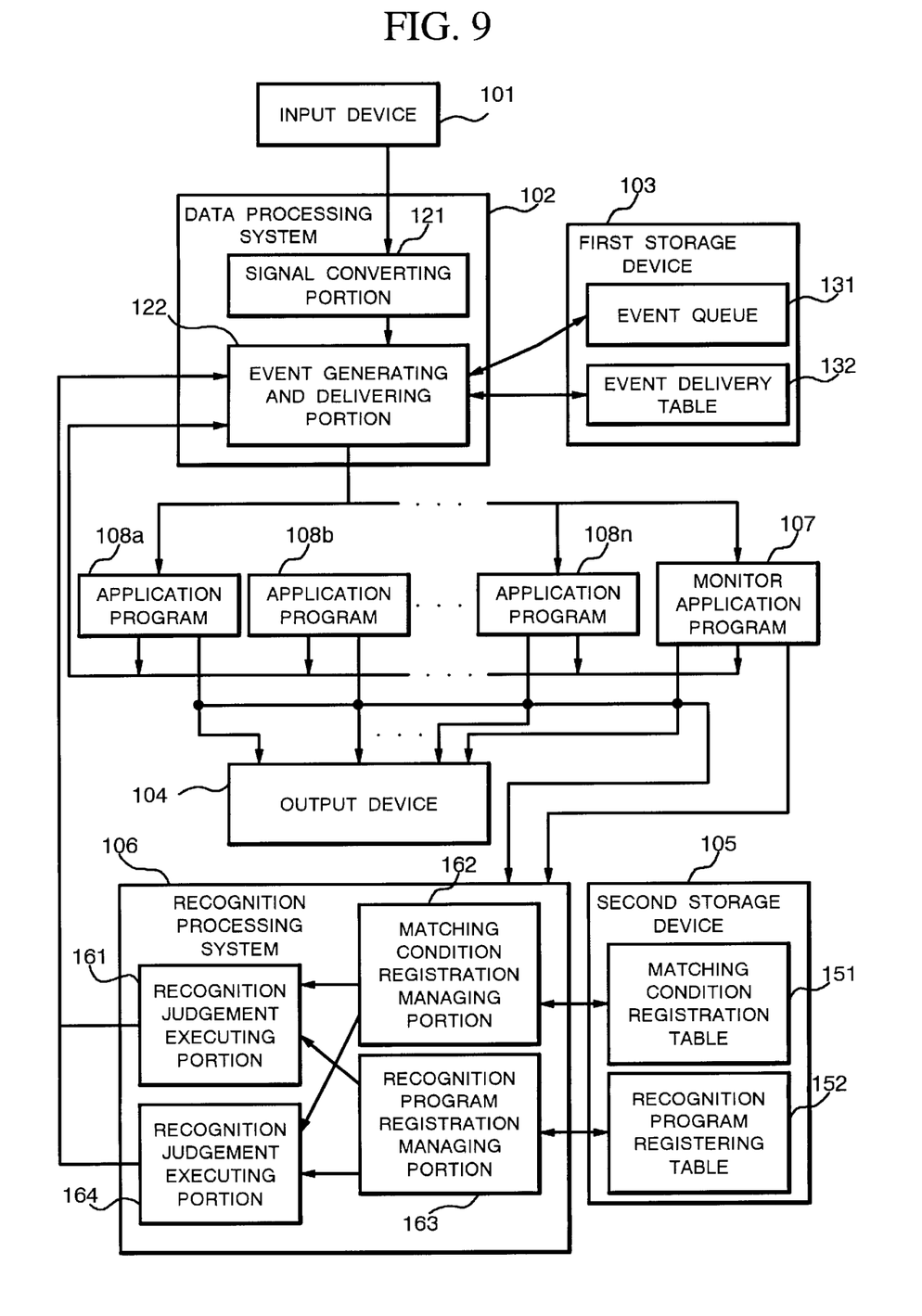
FIG. 9 is a block diagram showing the construction of the fourth embodiment of an event generating and delivering system in a computer system according the present invention.

On the other hand, FIG. 9 is a block diagram showing the construction of the fourth embodiment of the event generating and delivering system in the computer system, according to the present invention. In FIG. 9, the like elements to the elements the same as or similar to those in FIGS. 1 to 3, will be represented by the same reference numerals and discussion therefor will be neglected for simplification of disclosure. The fourth embodiment has the construction, in which the constructions of the second and third embodiments are combined. Namely, instead of inputting the output state of the output device 104 to the recognition processing system 106, the output instruction and the output data from the application program to the output device 104 are input to the recognition processing system 106. Also the shown embodiment includes two recognition judgement executing portions 161 and 164 for making judgement whether the output instruction and the output data are matched with the matching condition by executing the recognizing program. In this case, taking the output instruction and the output data as the parameter of the output instruction as mutually separated matching conditions, judgements are made by two recognition judgement executing portions 161 and 164 for respective matching conditions. Thus, a period required for recognition can be shortened.

As set forth above, the event generating and delivering system according to the present invention can dynamically generate events corresponding to the specific result of output, such as graphic output or the voice output and enable automatic execution the process corresponding to respective event without interaction of the user. Thus, the user is released from observing or listening to the results of the output and performing predetermined operation according to the result of judgement. Thus, load on the user can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An event generation system for a computer system, comprising:

a matching condition management subsystem for designating a selected matching condition from among matching conditions associated with predetermined events in accordance with output data of an application program of said computer system;

a recognition subsystem for determining whether output data of said application program satisfies a selected matching condition using a recognition program associated with the selected matching condition; and an event generation subsystem for generating an event associated with a satisfied matching condition when output data of said application program satisfies a selected matching condition.

2. An event generation system as set forth in claim 1, wherein said output data of said application program is graphic display data, and said matching condition is a combination of image data, character data and numerical data representing a display of a graphic display device.

3. An event generation system as set forth in claim 1, wherein said output data of said application program is audio data, and said matching condition is a combination of voice data, and numerical data representing output of an audio output device.

4. An event generation system as set forth in claim 1, wherein said recognition subsystem reports a non-matching condition to said event generation system when said output data does not match said selected matching condition.

5. An event generation system for a computer system, comprising:
   a matching condition management subsystem for designating selected mutually exclusive matching conditions from among matching conditions associated with predetermined events in accordance with output data of an application program of said computer system;
   a recognition subsystem for determining whether output data of said application program satisfies any of said selected mutually exclusive matching conditions using recognition programs associated with the selected mutually exclusive matching conditions; and
   an event generation subsystem for generating an event associated with a satisfied matching condition when output data of said application program satisfies one of said selected mutually exclusive matching conditions.

6. An event generation system as set forth in claim 5, wherein said output data of said application program is graphic display data, and at least one of said mutually exclusive matching conditions is a combination of image data, character data and numerical data representing a display of a graphic display device.

7. An event generation system as set forth in claim 5, wherein said output data of said application program is audio data, and at least one of said mutually exclusive matching conditions is a combination of voice data, and numerical data representing output of an audio output device.

8. An event generation system as set forth in claim 5, wherein said recognition subsystem reports a non-matching condition to said event generation system when said output data does not match one of said selected mutually exclusive matching conditions.

9. An event generation system for a computer system, comprising:
   a matching condition management subsystem for designating selected mutually exclusive matching conditions from among matching conditions associated with predetermined events in accordance with output instructions of an application program of said computer system;
   a recognition subsystem for determining whether an output instruction of said application program satisfies a selected matching condition using a recognition program associated with the selected matching condition; and
   an event generation subsystem for generating an event associated with a satisfied matching condition when an output instruction of said application program satisfies the selected matching condition.

10. An event generation system for a computer system, comprising:
    a matching condition management subsystem for designating selected mutually exclusive matching conditions from among matching conditions associated with predetermined events in accordance with output instructions of an application program of said computer system;
    a recognition subsystem for determining whether an output instruction of said application program satisfies any of said selected mutually exclusive matching conditions using recognition programs associated with the selected mutually exclusive matching conditions; and
    an event generation subsystem for generating an event associated with a satisfied matching condition when an output instruction of said application program satisfies one of said selected mutually exclusive matching conditions.

* * * * *